(12) United States Patent
Panas (10) Patent No.: US 12,468,143 B2
(45) Date of Patent: Nov. 11, 2025

(54) COMMAND TRANSLATION FOR PHYSICAL CONTROL OF SEGMENTED ARRAY

(71) Applicant: Bright Silicon Technologies, Inc., Livermore, CA (US)

(72) Inventor: Robert Matthew Panas, Livermore, CA (US)

(73) Assignee: Bright Silicon Technologies, Inc., Pleasanton, CA (US)

(*) Notice: Subject to any disclaimer, the term of this patent is extended or adjusted under 35 U.S.C. 154(b) by 0 days.

(21) Appl. No.: 19/186,042

(22) Filed: Apr. 22, 2025

(65) Prior Publication Data

US 2025/0264714 A1     Aug. 21, 2025

Related U.S. Application Data

(63) Continuation of application No. PCT/IB2024/057655, filed on Aug. 7, 2024.

(60) Provisional application No. 63/531,184, filed on Aug. 7, 2023.

(51) Int. Cl.
| | |
|---|---|
| *G02B 26/08* | (2006.01) |
| *G02B 7/18* | (2021.01) |
| *G02B 7/182* | (2021.01) |

(52) U.S. Cl.
CPC ......... *G02B 26/0833* (2013.01); *G02B 7/181* (2013.01); *G02B 7/1821* (2013.01)

(58) Field of Classification Search
CPC .. G02B 26/0833; G02B 7/181; G02B 7/1821; G02B 26/10
See application file for complete search history.

(56) References Cited

U.S. PATENT DOCUMENTS

| | | |
|---|---|---|
| 6,208,439 B1 | 3/2001 | McArthur |
| 2015/0261794 A1 | 9/2015 | Lehrian |
| 2016/0316190 A1 | 10/2016 | Mccloskey |
| 2022/0276544 A1 | 9/2022 | Panas |
| 2023/0022548 A1* | 1/2023 | Knapp ............... G02B 26/0833 |

FOREIGN PATENT DOCUMENTS

CN     109946712 A     6/2019

OTHER PUBLICATIONS

International Search Report and Written Opinion regarding International Application No. PCT/IB24/57655, mailed Nov. 29, 2024.

* cited by examiner

*Primary Examiner* — Euncha P Cherry
(74) *Attorney, Agent, or Firm* — Miller Johnson (57) ABSTRACT

A system includes a non-transitory computer-readable medium configured to store a mapping between a set of subapertures and multiple adjustable optical elements. The system includes a user interface module configured to store properties of the set of subapertures and selectively update the mapping in response to user input. The system includes a command generation module configured to generate element commands for controlling the multiple adjustable optical elements based on the properties of the set of subapertures. Generating an element command for a first element of the multiple adjustable optical elements includes identifying an applicable subaperture for the first element, generating an initial command for the first element, and outputting the element command for the first element based on the initial command.

26 Claims, 5 Drawing Sheets

COMMAND TRANSLATION FOR PHYSICAL CONTROL OF SEGMENTED ARRAY

CROSS-REFERENCE TO RELATED APPLICATIONS

This application is a continuation of PCT International Application No. PCT/IB 2024/057655 filed Aug. 7, 2024, which claims the benefit of U.S. Provisional Application No. 63/531,184 filed Aug. 7, 2023. The entire disclosures of the above applications are incorporated by reference.

STATEMENT REGARDING FEDERALLY SPONSORED RESEARCH OR DEVELOPMENT

This invention was made with government support under Contract No. HQ085022C0003 awarded by the Space Development Agency. The government has certain rights in the invention.

FIELD

The present disclosure relates to electromechanical control systems and more particularly to control systems for arrays of optical elements.

BACKGROUND

Segmented arrays-such as segmented micromirror arrays-pose significant control challenges. User specifications are generally at the level of optical surface properties such as tip, tilt, piston, or higher Zernike modes. However, the elements of the array require specific element-level commands. Segmented arrays may include hundreds or thousands of elements. Each element may have one or more degrees of freedom; in various implementations, each element of the array has the same number of degrees of freedom.

With many elements, and multiple degrees of freedom, it is difficult for a user to specify all of the required element-level commands. This is especially true in an optical system where the adjustment of each element may need to be accurate to a small fraction of the wavelength of steered light. A general, effective, and simple approach to control a segmented array is needed. At present, one common approach is to control elements in bulk with identical commands. Bulk control limits the complexity of the optical states achievable by the segmented array. Another approach is to require the user to pre-process a desired optical surface into specific element-level commands. This still requires the user to identify how to turn optical surfaces into commands with potentially thousands of degrees of freedom; because it is a slow and cumbersome process, it must be performed ahead of time. User-side translation into element-level commands requires detailed knowledge about the segmented array, which can be difficult for the user to access and can be difficult to implement in the user's computing framework.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a non-transitory computer-readable medium configured to store a mapping between a set of subapertures and a plurality of adjustable optical elements. The system includes a user interface module configured to store properties of the set of subapertures and selectively update the mapping in response to user input. The system includes a command generation module configured to generate element commands for controlling the plurality of adjustable optical elements based on the properties of the set of subapertures. Generating an element command for a first element of the plurality of adjustable optical elements includes identifying an applicable subaperture for the first element, generating an initial command for the first element, and outputting the element command for the first element based on the initial command.

In other features, generating the element command for the first element includes determining limits of the first element and producing an adjusted command by selectively adjusting the initial command based on the limits. In other features, the element command for the first element is based on the adjusted command.

In other features, the limits of the first element are based on a position of the first element specified by the initial command. In other features, the limits of the first element are based on physical position and orientation limits of the first element. In other features, the limits of the first element are based on limits encoded in a controller that drives the first element according to the element command.

In other features, generating the element command for the first element includes creating a modified command by selectively modifying the initial command to implement phase wrapping across ones of the plurality of adjustable optical elements mapped to the applicable subaperture. In other features, the element command for the first element is based on the modified command.

In other features, a setting specified by the user controls whether the initial command is modified to implement phase wrapping. In other features, the mapping is configured to map each subaperture of the set of subapertures to a corresponding subset of the plurality of adjustable optical elements. In other features, the mapping is configured to map each element of the plurality of adjustable optical elements to a subset of the set of subapertures.

In other features, the system includes a controller configured to exercise closed-loop control of the plurality of adjustable optical elements based on the element commands. In other features, the controller is configured to, for each element of the plurality of adjustable optical elements, independently exercise closed-loop control of the element based on a respective one of the element commands.

In other features, the system includes the plurality of adjustable optical elements. In other features, the system includes a segmented micromirror array that includes the plurality of adjustable optical elements. In other features, the plurality of adjustable optical elements includes at least 100 adjustable optical elements. In other features, the plurality of adjustable optical elements includes at least 1000 adjustable optical elements.

In other features, the plurality of adjustable optical elements is arrayed in a two-dimensional grid. In other features, each of the plurality of adjustable optical elements is adjustable across multiple degrees of freedom. In other features, each of the plurality of adjustable optical elements is adjustable across three degrees of freedom. In other features, the three degrees of freedom are tip, tilt, and piston.

In other features, the system includes an environmental adjustment module configured to adjust the element commands in response to observed conditions of the plurality of adjustable optical elements. In other features, the system includes an environmental sensor module configured to provide data to the environmental adjustment module that is indicative of the observed conditions of the plurality of adjustable optical elements. In other features, the environmental sensor module includes a set of temperature sensing devices configured to be responsive to temperatures of the plurality of adjustable optical elements.

In other features, the environmental adjustment module is configured to receive temperatures from a set of temperature sensing devices. In other features, the set of temperature sensing devices has fewer elements than a number of the plurality of adjustable optical elements. In other features, the environmental adjustment module is configured to interpolate temperatures from the set of temperature sensing devices to determine individual temperatures of the plurality of adjustable optical elements.

In other features, generating the element command for the first element includes, in response to multiple subapertures being applicable to the first element, generating a respective command for each of the applicable subapertures. In other features, generating the element command for the first element includes, in response to multiple subapertures being applicable to the first element, combining the respective commands to be output as the element command for the first element. In other features, combining the respective commands includes, for each degree of freedom of the first element, averaging values for that degree of freedom from the respective commands.

A method includes storing a mapping between a set of subapertures and a plurality of adjustable optical elements. The method includes storing properties of the set of subapertures. The method includes selectively updating the mapping in response to user input. The method includes generating element commands for controlling the plurality of adjustable optical elements based on the properties of the set of subapertures. Generating an element command for a first element of the plurality of adjustable optical elements includes identifying an applicable subaperture for the first element, generating an initial command for the first element, and outputting the element command for the first element based on the initial command.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

The present disclosure describes a mechanism by which a user of a segmented array can specify high-level commands that are translated into element-level commands to drive respective elements of the segmented array. The present disclosure refers to micromirror arrays but the principles are applicable to other segmented arrays, such as other segmented optical arrays.

In the present disclosure, a user of a segmented array can specify a high-level state command to describe a subaperture for the array and then specify which elements of the array should be assigned to that subaperture. In this way, the user can specify multiple subapertures and then switch among them by changing which elements a subaperture maps to. With this approach, the user does not have to re-specify a subaperture when switching between two modes—two respective subapertures can be defined and each retain its existence independently of whether it is used to supply commands to any elements. The subaperture-to-element mapping can simply be updated to perform the switch. Subapertures can be defined for different optical inputs to the array, such as a laser of a particular incident orientation and wavelength, or for different array operations such as single-point vs large-area defocus, or for operation in different areas of the field-of-regard.

In addition, the user can specify multiple subapertures for the array that can be applied to different elements of the array—for example, one subaperture may be mapped to half of the elements while another subaperture may be mapped to the other half of the elements. For example, the user may select the elements in a checkerboard pattern, with each element being assigned to the other subaperture compared to the neighbor element. In other implementations, the user may select the elements using a random process that statistically assigns half of the elements to each subaperture, though not in a specific repeating pattern. In various implementations, the user may simply indicate a pattern, such as checkerboard or random, and have the system implement the pattern as the mapping.

The mapping is adaptable in real time to allow the user to reallocate elements between subaperture definitions. In various implementations, the mapping may take the form of specifying, for each element, a set of assigned subapertures (for example, each subaperture may be specified by a respective index); in implementations where an element can only accommodate a single subaperture at a time, this set will have a maximum size of one. In various implementations, the mapping may include, for each subaperture, a set of IDs indicating the elements allocated to it. To continue on the laser example, if the incoming laser beam is switched from one wavelength to another, then some (or all) elements can be correspondingly switched from a first subaperture to a second subaperture corresponding to the new wavelength.

By allowing the user to specify high-level commands and mappings, the amount of bandwidth needed between the user and the system is significantly decreased, as is the processing demand on the user side. This allows the hardware implementing the user side to be less expensive and/or to dedicate more resources to expanding user-side functionality.

In various implementations, multiple subapertures may be mapped to one or more elements; the elements may then be controlled based on a combination of the mapped subapertures. For example, a command for the element may be determined for each subaperture and then the commands for the applicable subapertures can be averaged. Each command may specify all of the degrees of freedom of the element. Combining multiple input commands to generate an output command may involve combining the degrees of freedom separately—for example, using a function such as average, minimum, maximum, etc. As an example, based on the average function, the first degree of freedom of the output command is equal to an average of the first degrees of freedom of the input commands, the second degree of freedom of the output command is equal to an average of the second degrees of freedom of the input commands, etc.

When creating an element-level command from the user-specified subapertures and mapping, the system relies on its real-time knowledge of (a) the element's exact as-calibrated location on the device to extremely high resolution (which ensures accurate optical surface calculations), (b) element motion limitations, which can be a function of the element position, and (c) element controller limitations, which can be used to decide the most efficient step necessary to reach certain locations of interest such as phase wrapping planes to ensure coherence with adjacent elements.

Block Diagram

Figure 1A:
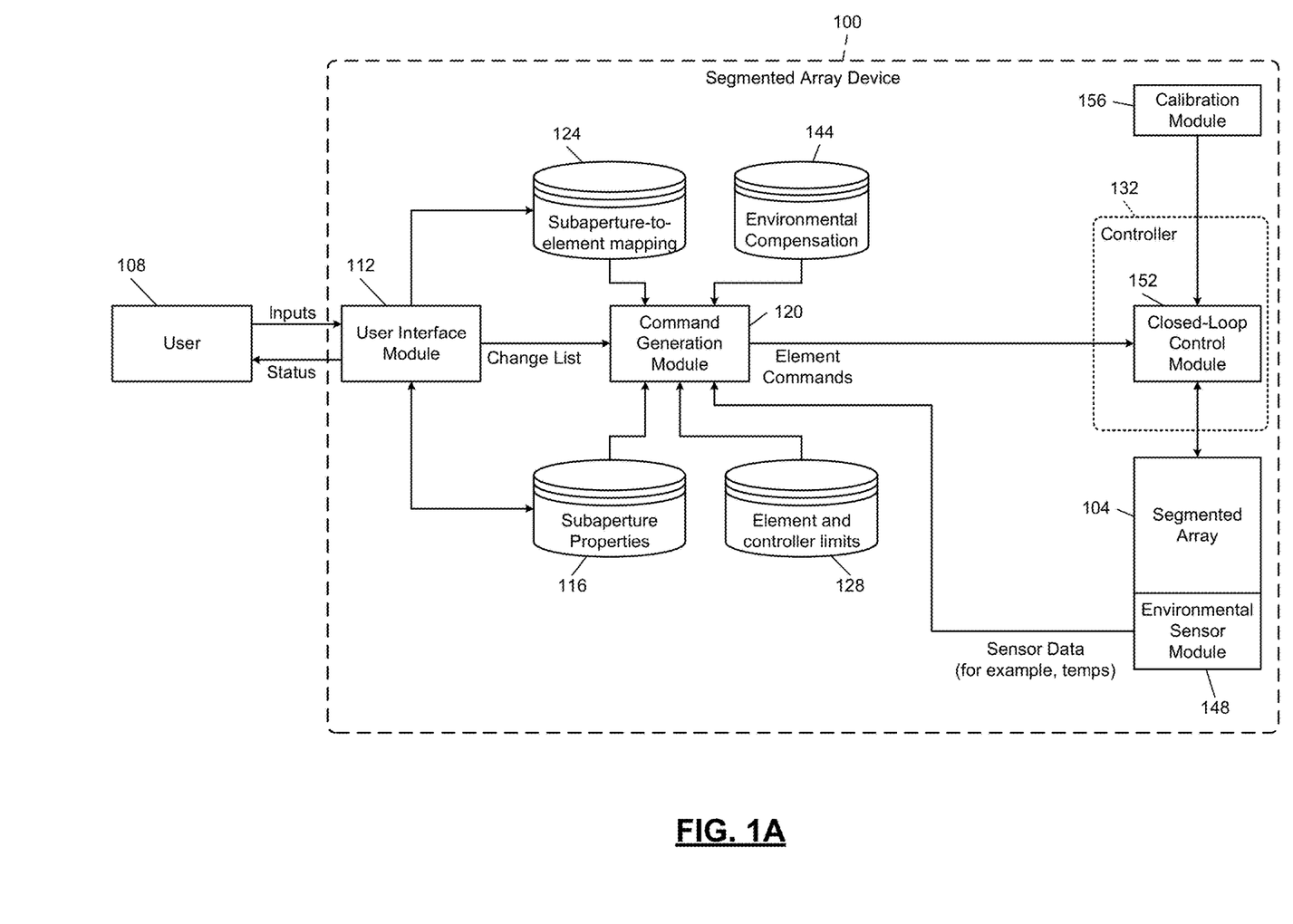
FIG. 1A is a functional block diagram of an example segmented optical system according to the principles of the present disclosure.

In FIG. 1A, a segmented array device 100 includes a segmented array 104. A user 108 of the segmented array device 100 is represented schematically. Note that the user 108 is not generally a human. Instead, the user 108 represents the application-level controller of the segmented array device 100. For example, the user 108 may include or be part of a controller for a laser system (not shown), where the segmented array 104 is used to adjust (for example, to focus or steer) a beam from a laser (not shown).

The user 108 interacts with the segmented array device 100 through a user interface module 112, which receives inputs from the user 108 an, in various implementations, provides status information to the user 108. For example, the user interface module 112 may indicate to the user 108 when one or more subapertures are not physically achievable. In various implementations, the user interface module 112 may indicate to the user 108 when elements of the segmented array 104 have been adjusted from the desired properties specified by the user 108 because of physical or controller-specified limitations of the elements.

The segmented array 104 includes multiple elements, which may be optical elements such as micromirrors. The elements in the segmented array 104 may be arranged in a two-dimensional pattern, such as a grid. In various implementations, the pattern may have a shape that is rectangular, square, circular, etc.

The user interface module 112 stores subaperture information specified by the user 108 in a subaperture properties data store 116, which may take the form of a database, a lookup table, etc. The subaperture properties data store 116 may store information about each subaperture, such as tip, tilt, curvature, higher-order Zernike mode, phase-wrapping (or phase-modulation) effects, and other optical surface properties. In various implementations, the information for a subaperture may represent all information needed to define the full optical surface state.

In various implementations, an optical surface may be defined by one of a set of built-in functions, such as a gaussian curve, a donut shape, a spiral shape, a Zernike polynomial, etc. For example, the user 108 may select a built-in function and specify parameters (such as polynomial coefficients) for the function. In various implementations, the user 108 can specify an optical surface using an arbitrary wave function.

Based on input from the user 108, the user interface module 112 stores information about which elements correspond to which subapertures into a subaperture-to-element mapping data store 124. In various implementations, multiple subapertures may map onto the same element. In various implementations, the number of potential subapertures may be restricted to a number less than a number of elements in the segmented array 104.

As described in more detail below, the command generation module 120 determines individual element commands based on subaperture information and the mapping of subapertures onto elements from the subaperture-to-element mapping data store 124. A limits data store 128 stores information on physical limits of the elements of the segmented array 104. Additionally, or alternatively, the limits data store 128 stores information on limits programmed into a controller 132 that controls the elements of the segmented array 104.

In various implementations, the software-defined limits of the controller 132 are the same as the physical limits of the elements of the segmented array 104; in some other implementations, the software-defined limits of the controller 132 incorporate a safety margin and stop short of driving the elements of the segmented array 104 fully to their physical limits. The software-defined limits of the controller 132 may prevent damage to an element that may be caused by attempting to drive it past its physical limits; further, the software-defined limits may avoid wasting power that might be expended in attempting to drive an element to a location it cannot reach.

In various implementations, the limits (whether physical or software-defined) are the same across all elements. In some other implementations, limits may be defined separately for each element. In still other implementations, there might be multiple sets of limits for groups of elements—as one example, elements on the periphery of the segmented array 104 may have less range of motion.

The physical limits may be specified as a function or as a set of values. For example, an element that has three degrees of freedom (in this example, they will be tip, tilt, and piston, though other types of degrees of freedom are possible) may not have a fixed amount of tilt. Instead, the amount of tilt may depend on the current amount of piston for the element. Based on the limits data store 128, the command generation module 120 constrains the element commands to be physically achievable as well as able to be effectuated by the controller 132.

In various implementations, the command generation module 120 may adjust the element commands based on parameters specified by an environmental compensation data store 144 combined with environmental sensor data (such as temperature). For example, mechanical and/or electrical components in the segmented array 104 may have a known thermal and/or humidity sensitivity. When this known sensitivity is combined with an environmental map (such as a thermal map), an environmental compensation term may be calculated for each element and combined with the other calculations in the command generation module 120 to determine the element commands.

The environmental compensation data store 144 stores information about this environmental dependency, which may be determined empirically for the segmented array 104. In various implementations, the environmental dependency may be the same for each segmented array while in other implementations, a factory or user measurement process may determine the environmental dependency of the segmented array 104.

In various implementations, an environmental sensor module 148 measures one or more environmental parameters of the segmented array 104. For example, the environmental sensor module 148 may measure a set of temperatures for the segmented array. When the number of measured temperatures is less than the number of elements of the segmented array 104, the temperature of a particular element may be interpolated based on its proximity to the measured temperatures. In various implementations, the interpolation may be based on extrinsic information, such as the type of light incident on the segmented array 104, which may need to be preprogrammed and/or specified by the user 108. For example, a gaussian laser beam may be hottest at its middle, allowing the heat of each element to be more accurately calculated from a limited number of temperature measurements.

In various implementations, the environmental sensor module 148 may be omitted and the command generation module 120 may ignore environmental variations. For example, these implementations may be used in environments where heat and humidity are tightly controlled and/or where the segmented array 104 is less sensitive to changes in heat and humidity.

The element commands are used by the controller 132 to control the elements of the segmented array 104. For example, the controller 132 may include a closed-loop control module 152. In various implementations, for N elements, the closed-loop control module 152 may operate N closed-loop circuits, each responsible for adjusting the respective element according to the respective received command.

In various implementations, a calibration module 156 may provide calibration data to the closed-loop control module 152 for use in controlling the elements. For example, a calibration process—which might be performed at the time of production and/or in situ—may determine that a particular input signal (such as a voltage) to an element may have a different effect on the element's properties (position, orientation, etc.) than expected. The calibration process allows for the input signal to be adjusted so that the expected effect is achieved.

In various implementations, the controller 132 may be implemented as a custom integrated circuit, such as an application-specific integrated circuit (A SIC) or field-programmable gate array (FPGA) to allow for fast response times—that is, a high control bandwidth. Meanwhile, other functions, such as the command generation module 120, may be implemented in a more general-purpose processor architecture to allow for more flexible programming using higher-level languages.

Further details about example implementations of the system are shown in U.S. Pat. No. 11,030,148, issued 8 Jun. 2021, and titled "Massively Parallel Hierarchical Control System and Method," the entire disclosure of which is hereby incorporated by reference.

In various implementations, the segmented array device 100 may integrated into a single physical entity, such as a printed circuit board. In various implementations, the segmented array device 100 may be manufactured by a single entity for use with various third-party systems. In other implementations, the segmented array device 100 may exclude certain components.

Figure 1B:
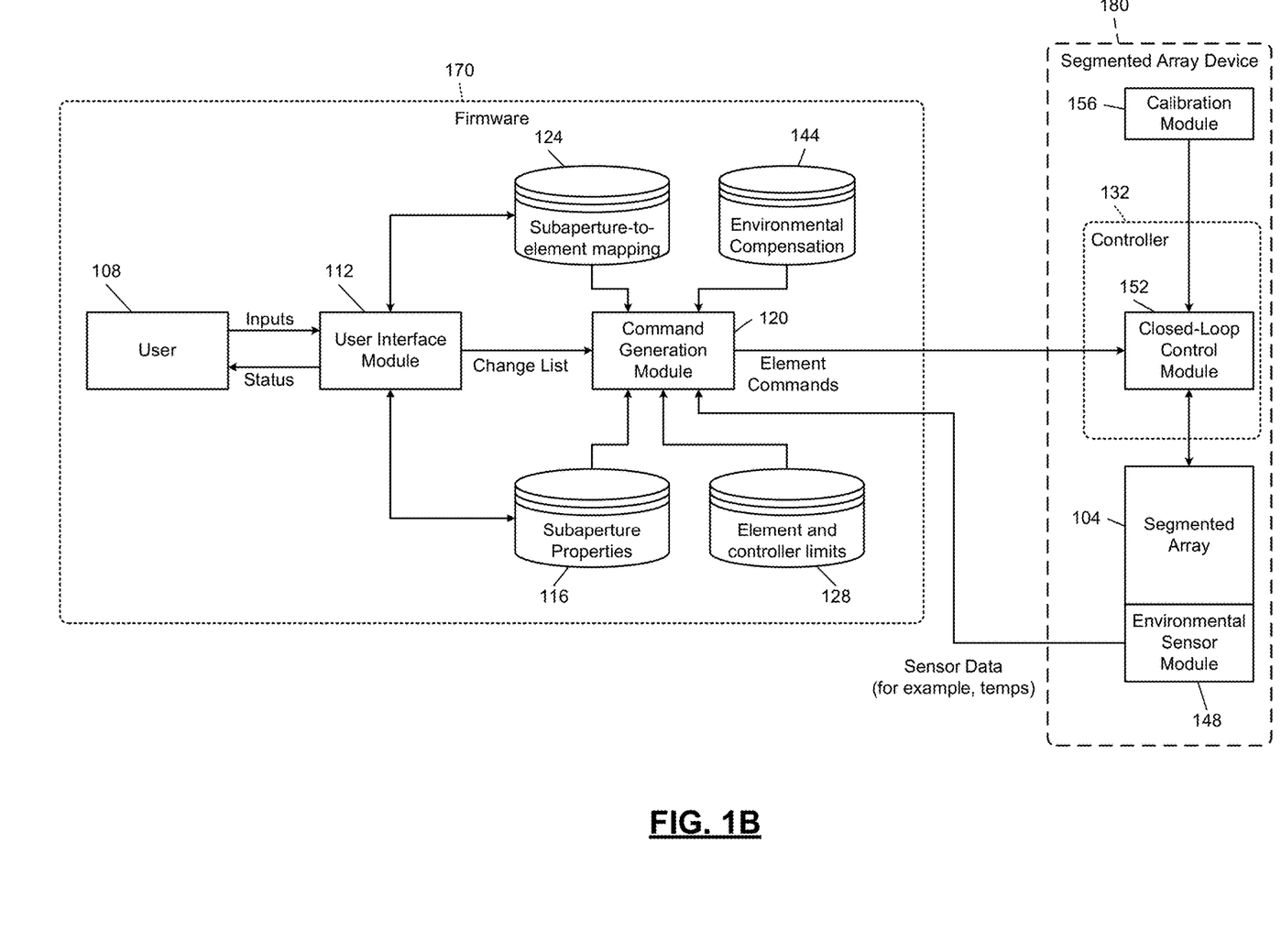
FIG. 1B is a functional block diagram of another example segmented optical system according to the principles of the present disclosure.

In FIG. 1B, another example implementation is shown in which some components are referred to as firmware 170. In this example, the firmware 170 includes the user 108, the user interface module 112, the subaperture properties data store 116, the command generation module 120, the subaperture-to-element mapping data store 124, the limits data store 128, and the environmental compensation data store 144. Although graphically depicted in a single rectangle, the firmware 170 may be implemented across multiple processors, multiple processor cores, etc.

Logically integrating some or all of the firmware 170 with the segmented array device 100 may provide a more complete solution for the user, but increases the processing requirements within the segmented array device 100. Alternately, locating some of all of the firmware 170 outside of a segmented array device 180 may allow the firmware 170 to be within the user's computational systems. In various implementations, this may allow the command generation module 120 to be implemented on faster computational hardware, reduce latency, and more effectively integrate into the systems of the user 108.

The present disclosure provides an interface between state commands from the user 108 and element-level commands provided to the controller 132. The user interface module 112, being user-facing, may be tuned to the preferred format of the user. For example, the user interface module 112 may implement an application programming interface (API) that can be adjusted to best accommodate an existing or desired communications format of the user 108. In various implementations, the user 108 may send commands to the user interface module 112, where each command has a header to specify whether the command relates to subaperture properties or to the subaperture-to-element mapping.

In various implementations, the user interface module 112 may determine which elements have changed-due to either an applicable subaperture having changed properties or to the mapping changing—and provide the change list to the command generation module 120. The firmware 170, including the command generation module 120 and associated components, may be embedded with other processing equipment of the user 108, with a connector providing element commands to the controller 132.

Control

Figure 2A:
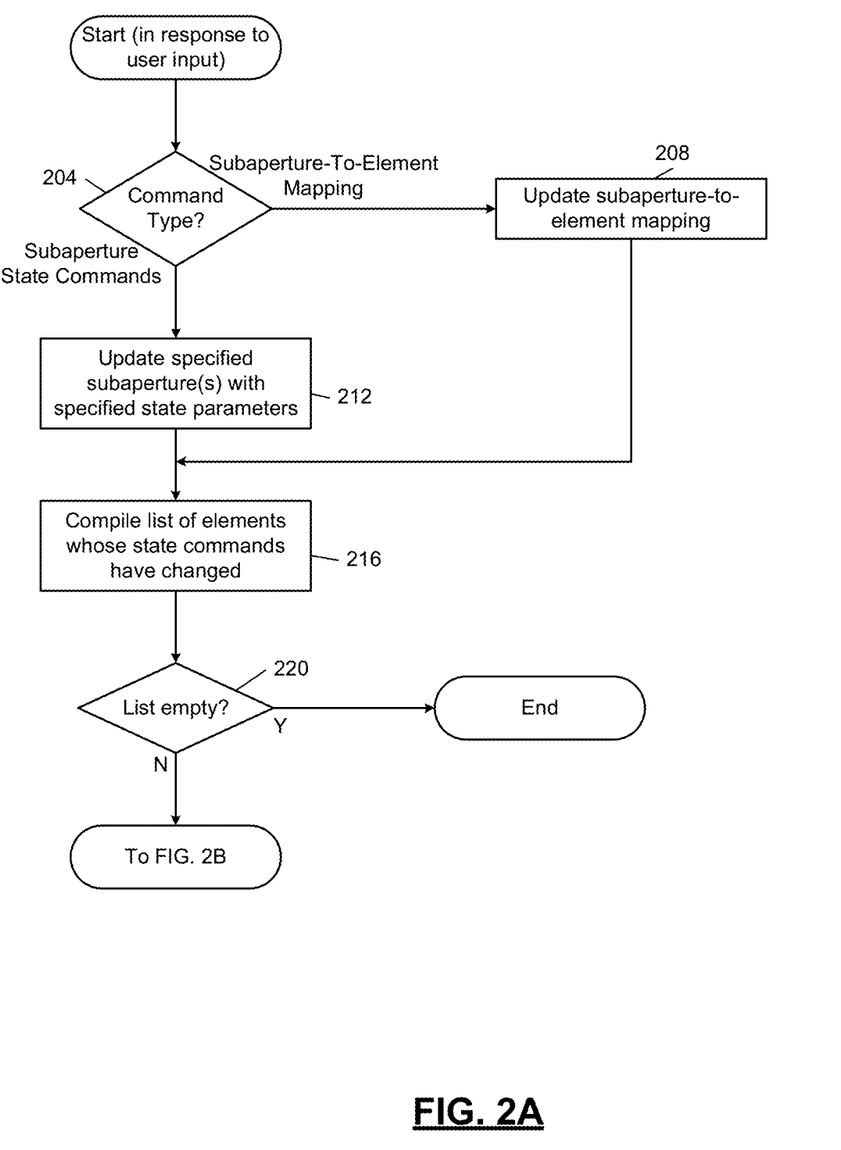
FIGS. 2A and 2B together form a flowchart of example control operation of the system of FIGS. 1A and 1B in response to changed inputs.
Figure 2B:
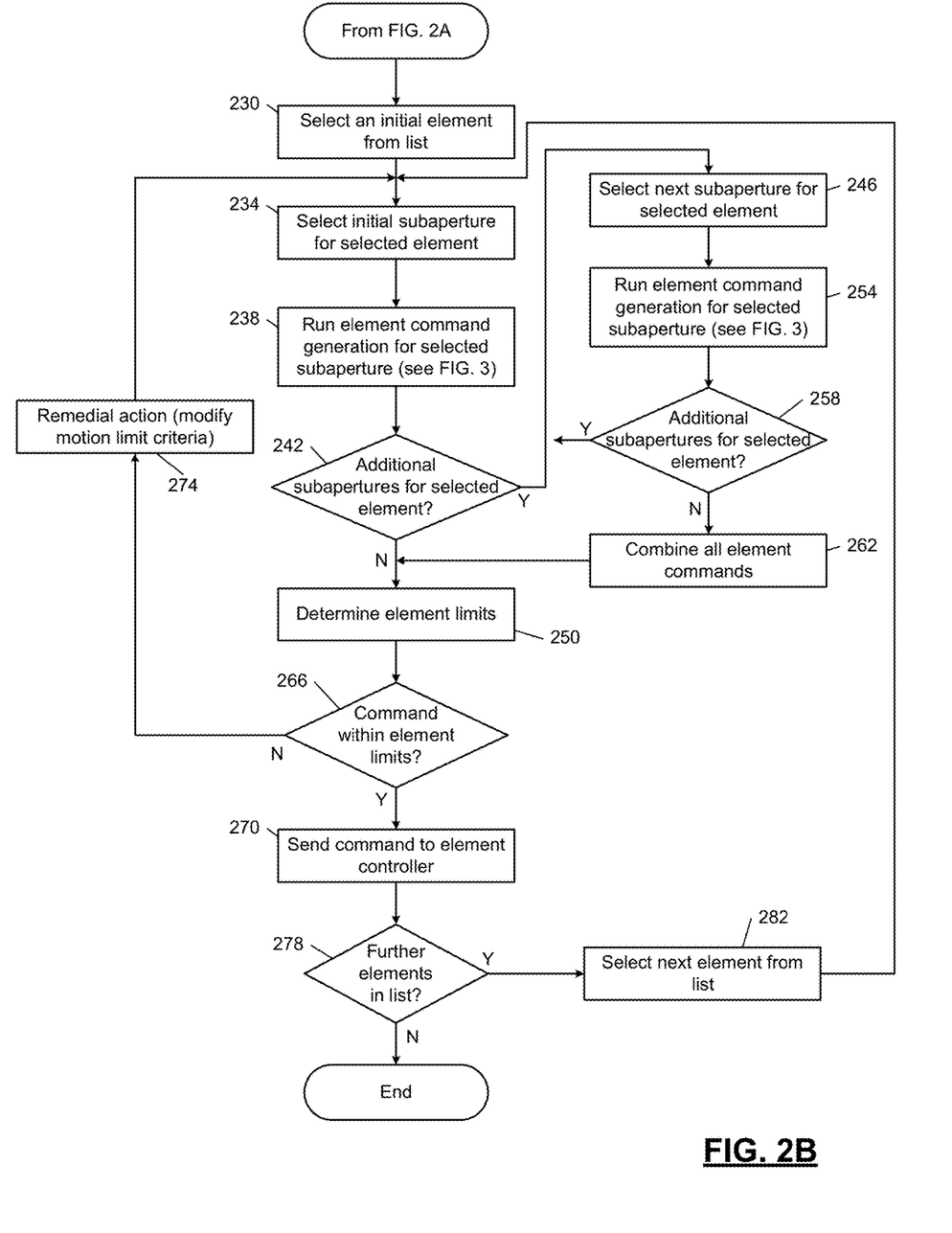

FIGS. 2A and 2B together represent a flowchart of example operation of array control according to the principles of the present disclosure. Control begins, in response to user input, at 204. At 204, if the user input is related to subaperture-to-element mapping, control transfers to 208; otherwise, if the user input is related to subaperture state commands, control transfers to 212.

At 208, control updates the subaperture-to-element mapping based on the user input and continues at 216. For example, the user may specify which elements are mapped to a specific subaperture by providing a list of element IDs—in various implementations, each element may have a unique integer ID. In various implementations, the system may have predefined sets of elements from which the user can choose. Examples of these predefined sets may include: all the elements, even rows of the elements, odd rows of the elements, even columns of the elements, odd columns of the elements, elements falling on white spaces of a checkerboard pattern, elements falling on black spaces of a checkerboard pattern, a first set of elements randomly chosen with a 50% probability, a second set of elements complementary to the first set of elements, etc. In various implementations, the user may be able to define their own sets of elements. Then, in order to establish a subaperture-to-element mapping, the user may simply specify the subaperture and the defined set in order to assign that assigned set of elements to the subaperture.

At 212, control updates the one or more subapertures implicated by the user input with the user-specified state parameters. Control then continues at 216. At 216, control compiles a list of elements whose state commands have changed—that is, any element that is assigned to a different subaperture or set of apertures and any element associated with a subaperture whose parameters have changed.

Control continues at 220. If, at 220, the list is empty (for example, if the changed subaperture is not currently associated with any elements), control ends. Otherwise, the list is not empty and control continues at 230 in FIG. 2B.

In FIG. 2B, control, at 230, selects an initial element from the list that was compiled at 216. At 234, control selects an initial subaperture to which the selected element is mapped. In other words, the control depicted in this example flow chart can accommodate an element that is mapped to multiple subapertures. Control therefore identifies which subaperture or subapertures are applicable to the selected element and selects a first one of them. In various implementations, the order is immaterial, so the order in which the subapertures are selected is simply a function of whatever data structures are used to maintain the mapping and/or identify relevant subapertures (for example, a HashMap class of the Java programming language). At 238, control executes (or, runs) an element command generation process for the selected subaperture. The element command generation process may be the one described below with respect to FIG. 3.

At 242, control determines whether the element is mapped to one or more additional subapertures; if so, control transfers to 246 and otherwise control transfers to 250. At 246, control selects the next subaperture to which the element is mapped. Control continues at 254 and executes the element command generation process for the selected subaperture. Control then continues at 258 where, if the element is mapped to one or more additional subapertures, control returns to 246; otherwise, control transfers to 262. At 262, control combines the element commands generated for all of the subapertures to which the selected element is mapped. Control then continues at 250. In various implementations, combining the element commands may be performed by, separately for each degree of freedom, averaging the commands. In other implementations, combining the element commands may be performed by, for each degree of freedom, selecting the highest value from the element commands. In various implementations, the user may be able to select between these two approaches.

At 250, control determines physical limits for the element. At 266, control determines whether the command for the element is within the element limits; if so, control transfers to 270 and otherwise control transfers to 274. At 274, control performs remedial action, such as by modifying the motion limit criteria for element command generation. For example, control may increase a safety margin—that is, by limiting the range within which the initial physical command for the element can be defined. In this way, even if an initial physical command is modified (such as due to adjustments made for environmental or phase-wrapping reasons), the final physical command is more likely to be within the physical limits of the element. In various implementations, the amount of increase in the safety margin may be positively related to the excursion of the command beyond the element limits—that is, the further the command extended beyond the element limits, the more the safety margin will be increased. Control then returns to 234 to redetermine the element command.

At 270, the element command is within the physical limits of the element and is therefore sent to the element controller. At 278, control determines whether there are one or more additional elements in the list. If so, control transfers to 282; otherwise, control ends. At 282, control selects the next element from the list and returns to 234.

In various implementations, another approach to initiating FIG. 2A (that is, other than a user input) may be used. For example, recalculating element commands could be triggered for all elements on an ad-hoc basis or on a periodic basis. As another example, each element may be triggered separately to recalculate the respective command; this triggering might be done on a random basis such that, statistically, the delay between recalculating element commands will be the same across the elements. In various implementations, random selection without replacement may be used to prevent recalculating element commands for a certain element multiple times prior to a single calculation for another element.

Figure 3:
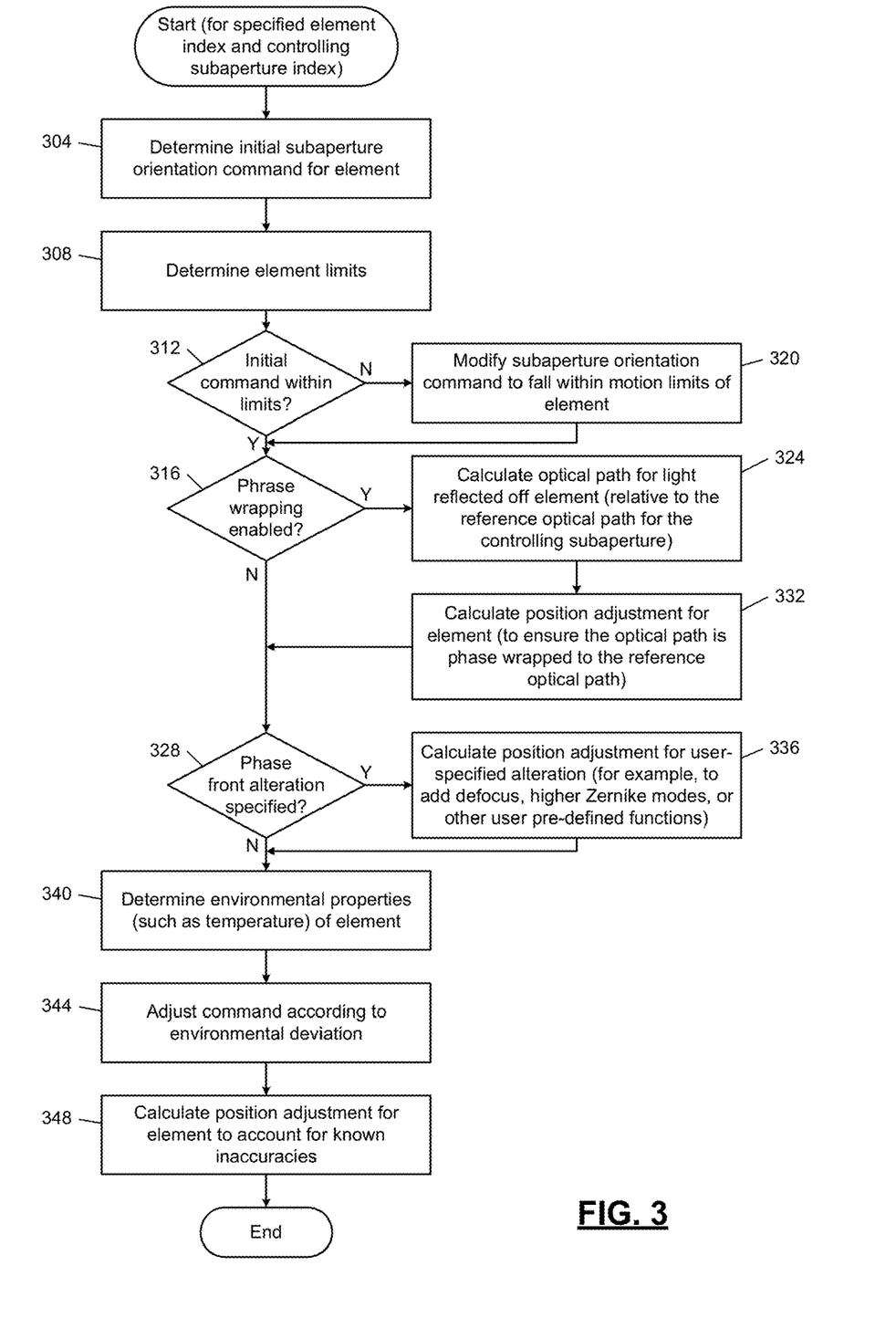
FIG. 3 is a flowchart of example control of element command generation.

In FIG. 3, control begins at 304 in response to specification of an element and a subaperture (for example, based on a numeric index of the subaperture). At 304, control determines an initial subaperture orientation command for the element based on the specified subaperture. The element command created at 304 attempts to meet the user-specified surface parameters (such as tip, tilt, and piston). In various implementations, the initial command is determined without restriction for the physical or controller limits on the elements—meaning that the initial command may not be physically realistic.

For example, the subaperture can be defined by the user with a nominal pointing angle of the aperture in 2 degrees of freedom, such as tip and tilt. The definition may also include a nominal piston value (vertical translation), which is the initial value applied to every element. The initial subaperture orientation command in this example is then generated based on the nominal pointing angles and piston. In an example mirror with tip, tilt, and piston degrees of freedom, the pointing angle sets the surface orientation of the mirror, while the piston value sets the pure z-translation applied to that surface. These three values—tip, tilt, and piston—set the surface plane of each mirror element in the same way that tip, tilt and origin height fully define a plane in geometry. The actuators driving the mirror in this example connect to the back of the mirror at one or more locations, so when the element command is generated, it is specifying the height of each of the points of actuation on the mirror. The height value in this example is a combination of the mirror tip, tilt, and piston.

At 308, control determines the limits of the element, which may be dependent on its commanded position. For example, a command with extreme tilt angle would likely hit limits on certain degrees of freedom. The user-supplied combination of parameters may produce commands which exceed the element physical or controller software limits. For example, at high tilt angles or a combination of tilt angles in several degrees of freedom, the command may require motion beyond the limits of one of the actuators. The limit check is then applied to the initial subaperture orientation command. At 312, if the initial subaperture orientation command is within these limits, control transfers to 316; otherwise, control transfers to 320.

At 320, control modifies the initial command to fall within the motion limits of the element. Control modifies the initial command, such as by scaling the command proportionally back to lie within the range of motion of the particular element. When an element has multiple degrees of freedom, the modification may take other forms, such as by modifying only those degrees of freedom that exceeded the range or adjusting other degrees of freedom. For example, while extreme tilt-angle commands may drive the actuators to a limit, certain motions on other degrees of freedom like vertical piston might alleviate this issue. Control then continues at 316.

In various implementations, control may omit 308, 312, and 320, proceeding direction from 304 to 316—such as when simply relying on the controller limits to enforce the physical feasibility of commands.

At 316, if the user has enabled phase wrapping for this subaperture, control transfers to 324; otherwise, control transfers to 328. A phase-wrapped surface is one in which the optical paths of a beam from a known orientation steered by all the elements in a subaperture are modified to be coherent—in other words, that they are offset from one another by an integer of the wavelength. This allows the elements to positively interfere their reflections with one another, creating a far-field beam that acts as if it came from a single fused optical surface. Phase coherence can be ensured by adjusting element commands (such as, in one example, the piston height) on each element to lock each element into the desired path length offset.

At 324, control applies phase wrapping modulation by calculating the optical path length for the element, finding the deviation from a reference path length for the controlling subaperture. The optical path length is determined by geometric analysis of the light incidence angle and element position. The incidence angle and element position fully define the path of light for each element, allowing total optical path length to be defined for each element and position. These values can be compared against a baseline reference path length to find relative path length differences for each element. The path length difference is a direct function of element position commands, meaning that it can be modified by adjusting the element position command. For example, increasing the element piston height will reduce the optical path length while decreasing the element piston height will increase the optical path length.

At 332, control calculates the position adjustment for the element in order to achieve phase wrapping by integer wavelength offsets from the reference path length. There may be multiple positions that satisfy the phase-wrapping criterion, so control is designed to choose one of the positions. In various implementations, the criteria for choosing the position may be specified by the user: for example, the criteria may include minimum motion, minimum relative deviation from nearest neighbors, etc. In any case, by choosing one of the positions that satisfy phase-wrapping, the element will produce an output with equivalent phase. With the calculation of the position adjustment, control has created an element command that will produce a flat effective wavefront for the emitted beam via phase wrapping. Control continues at 328.

In various implementations, phase wrapping may be omitted, in which case elements 316, 324, and 332 will be omitted. Control then proceeds directly from 312 to 328.

At 328, if the specified subaperture includes a user-specified phase front alterations, control transfers to 336; otherwise, control transfers to 340. At 336, the phase front (which may have been flattened by 332 in response to phase wrapping being enabled) is modified by the phase front alterations to generate specific beam effects. Control calculates a position adjustment for the user-specified alteration. For example, the alteration may include one or more of creating phase curvature, adding defocus, applying a higher-order Zernike mode, or other user pre-defined function.

Each of these commands define a phase front modification of the initially supplied phase front. The phase surface definition is understood in terms of the phase delay desired at each point over the physical aperture, which can be represented by a 3D surface plot. The 3D surface plot may be generated by a set of functions whose parameters are set by the user.

This surface plot has x-y axes representing the x-y axes across the aperture—in other words, the spatial extent of the optical aperture. Each element in the array has a specific x-y location in this space. The z-axis of the surface plot represents the desired phase modulation scale of the optical surface, which could be in units of waves, radians, or some other equivalent unit. So, a lens-like defocus will appear as a spherical convex/concave phase surface plot, with phase distortion increasing by the square of the distance from the x-y origin.

The surface has a specific value for each element on the aperture, and this phase delay can be calculated at the point of any specific element. The phase surface plot height and slope are calculated for the specified element (which has a known x-y location), using the user supplied parameters and the preprogrammed phase functions. A modulus calculation can be used on the surface plot height value to find the non-integer phase delay, which can be translated to a change in the element piston height command. The modulus calculation is carried out because the absolute number of waves does not matter, only the relative phase. The slope is translated to the desired tip, tilt change. These tip, tilt, and piston changes can then be mapped to element position command, allowing the element position command to be modified so that the specific element will support the user specified phase surface(s). Compensation can be applied for multiple effects by superimposing alteration commands. Control then continues at 340.

In various implementations, 328 and 336 may be omitted for environments where phase front alterations will not be specified. In various implementations, the phase front alterations may only be applied when phase wrapping is enabled—in other words, if phase wrapping is not enabled, control would proceed directly from 316 to 340.

At 340, control determines environmental properties—such as temperature and humidity—of the element. As an example, a 2D point grid of temperatures may have been measured and the temperature of the element may be interpolated based on its distance from points in the 2D grid (for example, the closest N points in the 2D grid, where N is an integer greater than one).

At 344, control adjusts the command according to the environmental properties of the element. For example only, increasing temperature may increase the z-axis position of the element (sometimes referred to as "piston"). Therefore, based on a temperature mapping, the command may be adjusted to account for this environmental deviation. In various implementations, the temperature mapping may be encoded as a lookup table or as a function (such as a linear function or higher-order polynomial). In various implementations, the temperature mapping may be determined empirically within the specific segmented array device—such as through a calibration process performed at the time of manufacturing. In other implementations, the temperature mapping may be determined empirically for a batch of segmented array devices or for all devices of a certain design revision.

In various implementations, environmental compensation may be omitted, which would omit 340 and 344.

At 348, control calculates a position adjustment for the element to account for known (that is, deterministic) inconsistencies and nonlinearities. These may be dependent on element position. As one example, the failure of small angle assumptions in the controller when the elements are tilted to large angles in multiple axes will introduce very small accuracy errors in the pointing direction of the element. These effects may be very complex to calculate and so are infeasible for integration into the closed-loop control. Instead, the errors can be calculated and corrected as part of element command generation. This avoids forcing the controller to calculate and compensate for the error with every cycle.

In various implementations, 348 may be omitted, such as when inconsistencies and nonlinearities are negligible or when they are addressed by another mechanism, such as the calibration module 156.

Control then ends (which may, in various implementations, return control to FIG. 2B).

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system comprising:
 a non-transitory computer-readable medium configured to store a mapping between a set of subapertures and a plurality of adjustable optical elements;
 a user interface module configured to:
  store properties of the set of subapertures, and selectively update the mapping in response to user input; and a command generation module configured to generate element commands for controlling the plurality of adjustable optical elements based on the properties of the set of subapertures, wherein generating an element command for a first element of the plurality of adjustable optical elements includes:
identifying an applicable subaperture for the first element,
generating an initial command for the first element, and
outputting the element command for the first element based on the initial command.

2. The system of claim 1 wherein:
generating the element command for the first element includes:
determining limits of the first element, and
producing an adjusted command by selectively adjusting the initial command based on the limits; and
the element command for the first element is based on the adjusted command.

3. The system of claim 2 wherein the limits of the first element are based on a position of the first element specified by the initial command.

4. The system of claim 2 wherein the limits of the first element are based on physical position and orientation limits of the first element.

5. The system of claim 2 wherein the limits of the first element are based on limits encoded in a controller that drives the first element according to the element command.

6. The system of claim 1 wherein:
generating the element command for the first element includes creating a modified command by selectively modifying the initial command to implement phase wrapping across ones of the plurality of adjustable optical elements mapped to the applicable subaperture, and
the element command for the first element is based on the modified command.

7. The system of claim 6 wherein a setting specified by a user controls whether the initial command is modified to implement phase wrapping.

8. The system of claim 1 wherein the mapping is configured to map each subaperture of the set of subapertures to a corresponding subset of the plurality of adjustable optical elements.

9. The system of claim 1 wherein the mapping is configured to map each element of the plurality of adjustable optical elements to a subset of the set of subapertures.

10. The system of claim 1 further comprising a controller configured to exercise closed-loop control of the plurality of adjustable optical elements based on the element commands.

11. The system of claim 10 wherein the controller is configured to, for each element of the plurality of adjustable optical elements, independently exercise closed-loop control of the element based on a respective one of the element commands.

12. The system of claim 1 further comprising the plurality of adjustable optical elements.

13. The system of claim 12 further comprising a segmented micromirror array that includes the plurality of adjustable optical elements.

14. The system of claim 12 wherein the plurality of adjustable optical elements includes at least 100 adjustable optical elements.

15. The system of claim 12 wherein the plurality of adjustable optical elements includes at least 1000 adjustable optical elements.

16. The system of claim 12 wherein the plurality of adjustable optical elements is arrayed in a two-dimensional grid.

17. The system of claim 12 wherein each of the plurality of adjustable optical elements is adjustable across multiple degrees of freedom.

18. The system of claim 17 wherein each of the plurality of adjustable optical elements is adjustable across three degrees of freedom.

19. The system of claim 18 wherein the three degrees of freedom are tip, tilt, and piston.

20. The system of claim 1 further comprising an environmental adjustment module configured to adjust the element commands in response to observed conditions of the plurality of adjustable optical elements.

21. The system of claim 20 further comprising an environmental sensor module configured to provide data to the environmental adjustment module that is indicative of the observed conditions of the plurality of adjustable optical elements.

22. The system of claim 21 wherein the environmental sensor module includes a set of temperature sensing devices configured to be responsive to temperatures of the plurality of adjustable optical elements.

23. The system of claim 20 wherein:
the environmental adjustment module is configured to receive temperatures from a set of temperature sensing devices;
the set of temperature sensing devices has fewer elements than a number of the plurality of adjustable optical elements; and
the environmental adjustment module is configured to interpolate temperatures from the set of temperature sensing devices to determine individual temperatures of the plurality of adjustable optical elements.

24. The system of claim 1 wherein generating the element command for the first element includes, in response to multiple subapertures being applicable to the first element:
generating a respective command for each of the applicable subapertures; and
combining the respective commands to be output as the element command for the first element.

25. The system of claim 24 wherein combining the respective commands includes, for each degree of freedom of the first element, averaging values for that degree of freedom from the respective commands.

26. A method comprising:
storing a mapping between a set of subapertures and a plurality of adjustable optical elements;
storing properties of the set of subapertures,
selectively updating the mapping in response to user input; and
generating element commands for controlling the plurality of adjustable optical elements based on the properties of the set of subapertures, wherein generating an element command for a first element of the plurality of adjustable optical elements includes:
identifying an applicable subaperture for the first element,
generating an initial command for the first element, and
outputting the element command for the first element based on the initial command.

* * * * *